UNITED STATES PATENT OFFICE.

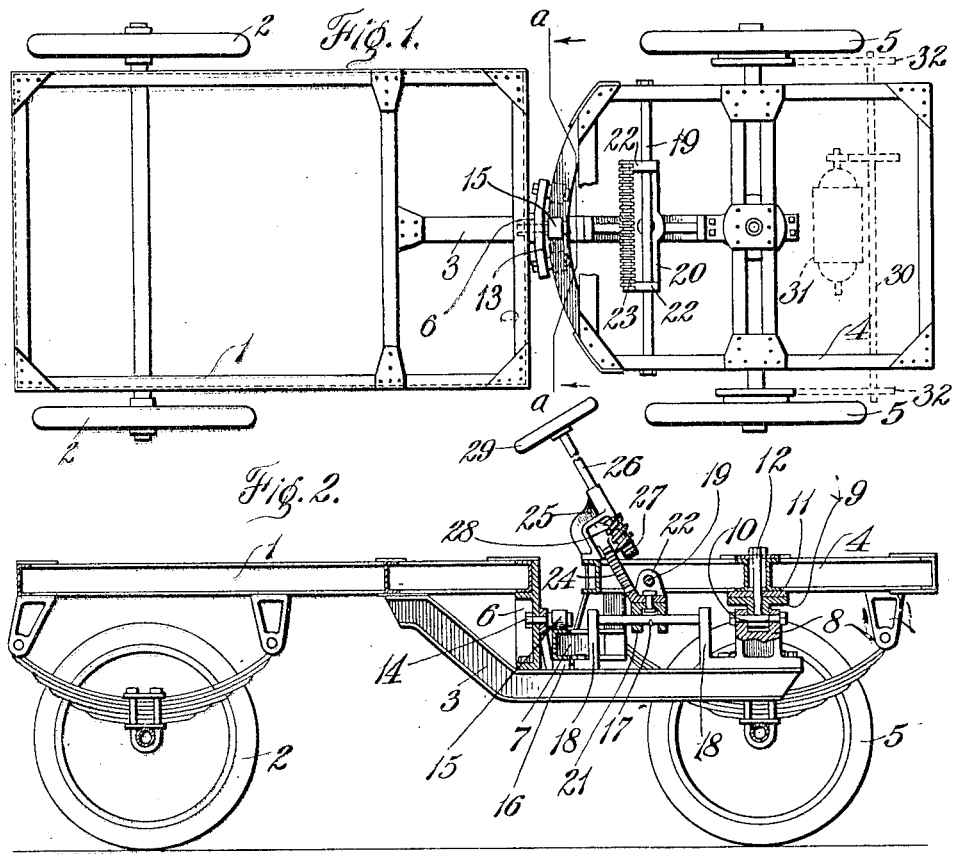

HENRY H. MARKER, OF MOUNT CLEMENS, MICHIGAN, ASSIGNOR OF THREE-FOURTHS TO FRANK G. KRUEGER, MARVIN A. SMITH, AND RALPH S. MOORE, ALL OF DETROIT, MICHIGAN.

VEHICLE-BODY.

1,085,350.  Specification of Letters Patent.  Patented Jan. 27, 1914.

Application filed November 15, 1911. Serial No. 660,332.

*To all whom it may concern:*

Be it known that I, HENRY H. MARKER, a citizen of the United States of America, residing at Mount Clemens, in the county of Macomb and State of Michigan, have invented certain new and useful Improvements in Vehicle-Bodies, of which the following is a specification, reference being had therein to the accompanying drawings.

This invention relates to body construction for automobiles and more especially to an arrangement of a fore-truck combination of the main body whereby the power plant may be mounted on and drive the forward bearing wheels, ample freedom of movement being permitted between the main and fore-body whereby the latter may be swung at any angle in relation to the main body and is tiltable independently of the main body regardless of the angle at which it stands.

The invention consists in the matters hereinafter set forth, and more particularly pointed out in the appended claims.

In the drawings Figure 1 is a plan view of a main body and fore-truck, partially broken away and partially in section that embodies features of the invention; Fig. 2 is a view partially in side elevation and partially in section of the fore truck and body showing one method of application of a manually operable steering device; Fig. 3 is a view in section on line *a—a* of Fig. 1 with the bearing wheels omitted; and Fig. 4 is a view enlarged in detail of a portion of the steering mechanism.

As herein indicated a main body platform 1, of suitable design and construction, is supported near its rear end by a pair of bearing wheels 2. A reach 3 extends from the forward end thereof under a fore body 4 likewise constructed of suitable material and supported on traction guide wheels 5.

The reach which preferably is bent downward and forward under a suitable supporting bracket 6 underruns a circle bar or track 7 at the rear of the fore truck and is provided at its outer end with a swiveled bearing 8 in which a fifth wheel 9 is swiveled on a pin 10 in the vertical plane of the reach 3 so that the fifth wheel may tilt freely laterally. A suitably disposed bearing plate 11 on the fifth wheel and king pin 12 of any preferred construction connect the fore-truck to the fifth wheel so that it may swing as desired in the plane of support of the bearing wheels 5 while free to tilt on the swivel pin 10. To further aid in the tilting movement the bracket 6 has a yoke 13 pivoted thereto on a pin 14 which forms a bearing for a friction roller 15 that rides on top of the circle bar 7. Friction rolls 16 on the depending ends of the yoke bear upwardly against the underside of the circle bar and aid in permitting free swinging of the latter on the reach 3 regardless of the angular position of the platform 4.

A guide 17 is mounted on the reach on suitable brackets 18 or the like in the plane of the reach and of the pin 12 and swivel pin 10. A transverse guide member 19 is mounted on the fore-frame substantially parallel to the axis of the wheels 5 preferably above the guide member 17. A rack frame 20 has depending ears 21 that have sliding engagement with the slide member 17 and upwardly extending arms 22 reciprocable on the fore-body guide 19. A rack 23 on the frame 20 is in mesh with the segmental gear 24 pivoted on the fore-body, preferably on a member forming a bracket or foot 25 for the steering post 26. The latter operates a worm 28 meshing with a segmental worm gear 27 integral with or secured to the rack gear 24 so that rotation of the post as by the usual steering wheel 29 or the like moves the rack 23 in one direction or the other and consequently shifts it along the guide 19 and the reach guide 17.

A jack shaft 30 operated as by a suitable motor 31 may be made to operate the traction bearing wheels 5 as through sprocket wheel connections indicated at 32 or other provision may be made for driving the wheels of the fore-truck. As a result of this construction a fore body is obtained that is free to tilt laterally independently of the main body while at the same time it may be swung to guide the main body regardless of any angular displacement.

The power plant and steering mechanism together with the fore body form a single unit so that the construction may be made very rigid while any form of main body may be attached to meet different requirements. The steering is positive and easy and the steering knuckles of the usual construction with their inherent weaknesses are obviated.

Obviously, changes in the details of construction may be made without departing from the spirit of the invention and I do not care to limit myself to any particular form or arrangement of parts.

What I claim is:—

1. The combination with a vehicle connecting member, of a fore-body pivotally attached to said member to turn upon a vertical axis and to tilt upon a horizontal axis extending longitudinally of said member, a pair of bearing wheels supporting said fore-body and turning upon an axis extending transversely of said member, a curved track adjacent to the rear end of the fore-body with its axis co-incident with the vertical axis upon which said fore-body turns, means to engage the track and prevent the fore-body from tilting longitudinally of said member, and means on the fore-body for turning the same upon its vertical axis.

2. The combination with a vehicle connecting member, of a fifth wheel on said member pivoted thereto to turn thereon upon a horizontal axis substantially parallel to said member to permit said fifth wheel to turn laterally of said member, a fore-body turning upon a vertical axis of the fifth wheel, bearing wheels supporting the fore-body, a member on the fore-body at the rear portion thereof concentric with the fifth wheel, means supported by the first mentioned member to engage the last mentioned member and prevent tilting of the fore-body longitudinally of the first mentioned member, and means on the fore-body for turning it on the fifth wheel.

3. The combination of a fore-body, bearing wheels supporting the fore-body, a vehicle connecting member extending into a plane parallel with the plane of said body, a pivotal connection between said member and the fore-body having a vertical pivot about which the fore-body is adapted to turn upon said member and a horizontal pivot extending longitudinally of said member upon which said fore-body is adapted to tilt laterally of said member, and means on the said member independent of said pivotal connection on which the fore-body turns to prevent said body from tilting longitudinally of said member.

4. The combination with a main body, bearing wheels supporting the said body and a forward extension of the body, of a fore body, bearing wheels supporting the fore body, means articulating the fore body to the extension to turn in the plane of support of the fore body bearing wheel and to tilt laterally of the extension, a guide on the extension in substantial alinement with the tilting axis of the fore body and substantially parallel to the extension, a guide on the fore body transverse to the extension guide, a frame reciprocable on both guides, and means on the fore body for shifting the frame on the fore body guide.

5. The combination with a main body, bearing wheels supporting the said body and a forward extension of the body, of a fore body, bearing wheels supporting the fore body, means articulating the fore body to the extension to tilt laterally thereof and to turn in the plane of support of the fore-body bearing wheels, a circle bar on the fore-body concentric with the turning axis of the fore body, a guide yoke pivoted on the main body, members on the yoke engaging and guiding the circle bar, and means on the fore body for moving the latter on its turning axis.

6. The combination with a main body, bearing wheels supporting the said body and a forward extension of the body, of a fore body, bearing wheels supporting the fore body, means articulating the fore body to the extension to tilt laterally thereof and to turn in the plane of support of the fore body bearing wheels, a circle bar on the fore body concentric with the turning axis of the fore body, a guide yoke pivoted on the main body on an axis alined with the said tilting axis of the fore body, members on the yoke engaging and guiding the circle bar, means on the fore body for moving the latter on its turning axis, a guide longitudinally disposed on the extension in alinement with the tilting axis of the fore body, a guide on the fore body transverse to the extension guide a frame reciprocable on both guides, and means on the fore body for shifting the frame on the fore body guide.

7. The combination with a main body, bearing wheel supporting the said body and a forward extension of the body, of a fore body, bearing wheels supporting the fore body, means articulating the fore body to the extension to tilt laterally thereof and to turn in the plane of support of the fore body bearing wheels, a circle bar on the fore body concentric with the turning axis of the fore body, a guide yoke, members on the yoke engaging and guiding the circle bar, means on the fore body for moving the latter on its turning axis, a guide longitudinally disposed on the extension in alinement with the tilting axis of the fore body, a guide on the fore body transverse to the extension guide, a frame reciprocable on both guides, means on the fore body for shifting the frame on the fore body guide, a rack arm on the frame, a worm gear in mesh with the rack pivoted on the fore body and a steering post mounted on the fore body and provided with a worm for operating the worm gear.

8. The combination with a main body, bearing wheels supporting the said body and a forward extension of the body, a swivel bearing on the extension, a swivel pin in the bearing substantially parallel to the extension, a fifth wheel pivoted on the swivel pin to tilt laterally of the extension with its axis transverse to the pin, a bearing plate on the fifth wheel, a fore body, to which the bearing plate is attached, bearing wheels supporting the fore body, a king pin connecting the fifth wheel and the bearing plate, a circle bar on the fore body concentric with the king pin axis, a guide yoke engaging the circle bar and swinging on an axis in alinement with the swivel pin axis, a guide on the extension in alinement with the swivel pin and yoke axes, a guide on the fore body transverse to the extension guide, a rack frame in sliding engagement with both guides, a rack thereon, a worm gear journaled on the fore body in mesh with the rack, a worm journaled on the fore body in mesh with the worm gear and a steering post for turning the worm.

In testimony whereof I affix my signature in presence of two witnesses.

HENRY H. MARKER.

Witnesses:
C. R. STICKNEY,
A. M. DORR.